UNITED STATES PATENT OFFICE.

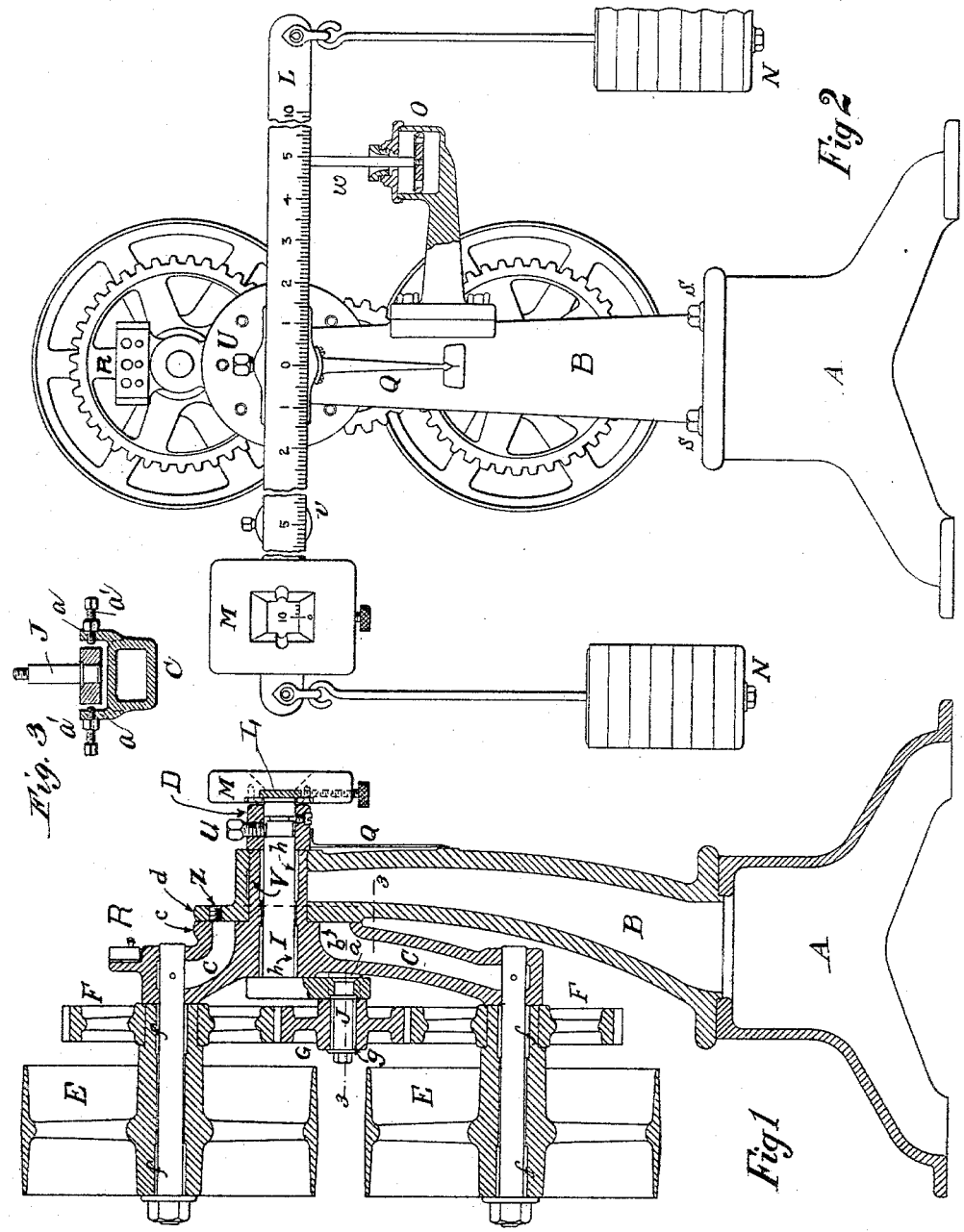

STILLMAN W. ROBINSON, OF COLUMBUS, OHIO, ASSIGNOR TO FREDERICK A. RIEHLE, OF PHILADELPHIA, PENNSYLVANIA.

TRANSMISSION-DYNAMOMETER.

SPECIFICATION forming part of Letters Patent No. 597,567, dated January 18, 1898.

Application filed February 27, 1896. Serial No. 581,087. (No model.)

*To all whom it may concern:*

Be it known that I, STILLMAN W. ROBINSON, a citizen of the United States, and a resident of Columbus, in the county of Franklin and State of Ohio, have invented certain new and useful Improvements in Transmission-Dynamometers, of which the following is a full, clear, concise, and exact description, reference being made to the accompanying drawings, forming a part of this specification.

This invention has for its object the production of an accurate and convenient dynamometer for measuring the power required to drive any machine run by a belt and to measure it while transmitted from the driving or main shaft to the machine and by interposing the dynamometer between the main shaft and machine to be measured, one belt connecting the main shaft to the dynamometer and another connecting the latter with the machine to be measured and to measure the power in the act of transmission through the dynamometer. Because power is here measured in the transmission this instrument is called a "transmission-dynamometer."

In the accompanying drawings, illustrating my invention, in the several views of which like parts are similarly designated, Figure 1 is a vertical section through the center of the instrument. Fig. 2 is a projection from the front where the observer stands in using the instrument. Fig. 3 is a horizontal cross-section of the crank and crosstree, taken in the plane of line 3 3, Fig. 1.

A is the main pedestal, supporting the entire instrument, and which is adapted to be secured in place in any suitable manner.

B is the main column, supported by and resting upon pedestal A, to which it is made fast by means of screws or T-bolts S S passing through slots or holes in the flange of column B and the pedestal A. By means of these screws or bolts and holes or slots the column may be put in any position of the whole revolution about a vertical axis.

C is a crosstree carried upon column B by means of a hub-like extension V, which is fitted into the head of column B and held fast in any position in the whole revolution by means of the flanges $c$ and $d$ and screws Z, tapped into the flange $d$ and passing through slots in flange $c$. There may be eight holes tapped into flange $d$, into any two of which the two screws Z may be put, so as to secure the desired position of crosstree C. The same result can also be accomplished by means of T-bolts and slots, as in the case of pieces A and B described above.

In the ends of crosstree C studs are driven, carrying the two pulleys E E to receive the belts, the power transmitted over which is to be measured. The pulleys E E have gears F F, mounted fast upon their hubs, which gears mesh into a central gear G on a crank-pin J, which is secured to or a part of the crank-shaft I, which shaft passes through the head $b$ and hub-like extension V of the crosstree C in line with one gear-mesh.

Upon the crosstree C are cast or otherwise applied two ears $a$ $a$, containing set-screws $a'$ $a'$ to serve as stops to prevent the crank I from moving too far to the one side or the other. (See Fig. 3.)

The gears F F and G serve to transmit motion from one pulley to the other, while at the same time the pressure of the teeth of the gears F F upon the gear G tend to push it to one side and to turn the crank I with greater or less force, according to the work being transmitted from one pulley to the other.

A measure of the work transmitted is obtained by attaching a poise-bar L to the opposite end of the crank-shaft and mounting thereon a poise-weight M and other weights on the scale-pans N, one at each end of bar. The poise-weight M will slide from end to end of the poise-bar L, one end being used for one direction of rotation and the other end for the opposite direction of motion.

The bar L is attached to the crank-shaft I by means of the coupling-piece D, made fast to the bar and held to the shaft I by a set-screw U.

To reduce the friction of parts to a minimum, roller-bearings are introduced at $f f$ in the hubs of the pulleys, at $g$ in the gear-hub on the crank-pin J, and at $h$ to support the crank-shaft in the central hub of crosstree C.

Q is a pointer to indicate position of poise-bar.

O is a dash-pot attached to the poise-bar by a rod $w$, said dash-pot containing oil and a loosely-sliding piston to prevent excessively quick lurches of the poise-bar.

*v* is a counterweight on the poise-bar on the arm opposite the dash-pot to balance the suspended parts of the dash-pot.

The poise-bar is graduated from "0" (zero) at the middle to "10" near each end, and the poise-weight has a "0" (zero) mark, as shown, to follow the scale. Some twelve to sixteen weights of five pounds each are provided for the scale-pans at each end of the poise-bar. When one of the five-pound weights is moved from one pan to the other, it counts five off of one side and five on the other, or ten in all, and just equals the poise-weight M of "10," as stated.

R on the top end of crosstree C is a counter to count up the revolutions made by the pulleys, an important element of recording in finding foot-pounds transmitted per minute. This counter may be of any approved construction. The foot-pounds per revolution are made out by taking due account of the weight M and the weights on the pans N.

To use the instrument in measuring the power required to drive a machine, it is set so that the pulleys E are in the plane of the belt which drives the machine. The pedestal A is securely fastened to the floor, and final adjustment may be got by screws S. Then the crosstree C is set so that if the belts are on that from the long arm of the crosstree C runs to the machine to be measured and that from the short arm to the main or power shaft, and in such position that if the crosstree C is loosened and turned a trifle one way it will tighten both belts, or if turned the other way it will loosen both belts the same amount. In this way the belts are kept to the proper tension and just that desired without relacing, which is a somewhat important element in this work, since an undue slip of belt is seriously detrimental, as well as undue tightness, causing unnecessary friction of the dynamometer. When the crosstree C is to be swung around, the set-screw U is to be loosened, as well as the screws Z, and again tightened when the crosstree is in the final position, so that the pointer Q will move either way from the "0" (zero) mark on column B. Now when the machine to be measured is running correctly by power transmitted through the dynamometer, place say five of the weights of five pounds each on each scale-pan N, ten weights in all; also bring the poise-weight M at "0," or the middle of the poise-bar. Then the poise-bar is balanced, and the crank will be found hard over against the stop-screw in the ear on the crosstree. Then move the poise-weight out in the direction toward balancing the pressure of crank against the stop-screw. When the poise-weight is out to "10," if the stop-screw is still under pressure move over a five-pound weight from one pan to the other and at the same time moving weight M back to "0." Again move weight M slowly toward "10," and if not balanced at "10" shift another five-pound weight over from one scale-pan to the other, at the same time moving weight M back to "0." Proceed this way until the poise-bar is found to balance exactly the pressure exerted by the gears upon the crank-pin, when a count is to be made of the number of five-pound weights moved over and of the position of the poise-weight on the poise-bar. Suppose the latter be 7.5 and that four of the five-pound weights were moved over, the record to be made is four weights counting ten each, equaling forty, and the poise-bar 7.5, making 47.5 in all. In the instrument as now constructed each five-pound weight is marked "5 lbs.=100 ft. lbs. per revolution as shifted from pan to pan." According to this the record made will be four hundred and seventy-five foot-pounds per revolution, there being in effect 4.75 weights shifted over. Then the counter R is to be read, and the difference between its present reading and that made at some noted time previously will give the revolutions per minute—say one thousand. This number multiplied by the foot-pounds per revolution will give the foot-pounds per minute—in this case four hundred and seventy-five thousand or 14.4 horse-power.

What I claim is—

1. In a transmission-dynamometer, a driving-pulley and a gear-wheel thereon, combined with a poise-bar, its shaft, a crank on such shaft, and a gear mounted on such crank with its point of contact or mesh with the pulley-gear arranged in the prolonged axis of said shaft, substantially as described.

2. In a transmission-dynamometer, a driven pulley and a gear-wheel thereon, combined with a poise-bar, its shaft, a crank on such shaft and a gear mounted on such crank with its point of contact or mesh arranged at the most remote point from the axis of the poise-bar, to give a maximum turning effect to the poise-bar for securing a maximum delicacy of indication, substantially as described.

3. In a transmission-dynamometer, a standard, a crosstree pivoted thereto and having arms of different length, a driving-pulley mounted upon the short arm and carrying a gear-wheel, and a driven pulley mounted on the long arm and carrying a gear-wheel, a poise-bar, a crank-shaft therefor, and a gear-wheel mounted on said crank and interposed between the gear-wheels of the pulleys, substantially as described.

4. In a transmission-dynamometer, a standard, a crosstree pivoted thereto and having arms of different length, a driving-pulley mounted upon the short arm and carrying a gear-wheel, and a driven pulley mounted on the long arm and carrying a gear-wheel, a poise-bar, a crank-shaft therefor, a gear-wheel mounted on said crank and interposed between the gear-wheels of the pulleys, and means to limit the movement of the crank, substantially as described.

5. In a transmission-dynamometer, a standard, a crosstree pivoted thereto and having arms of different length, a driving-pulley mounted upon the short arm and carrying a gear-wheel, and a driven pulley mounted on the long arm and carrying a gear-wheel, a poise-bar, a crank-shaft therefor, and a gear-wheel mounted on said crank and interposed between the gear-wheels of the pulleys, the said crank-shaft being coaxial with the pivot of the crosstree, substantially as described.

6. In a transmission-dynamometer, a standard, a crosstree pivoted therein, and driving and driven pulleys mounted upon said crosstree and overhanging one another, and means to adjust the said crosstree, substantially as described.

7. In a transmission-dynamometer, a standard, a crosstree, driving and driven pulleys thereon, a poise-bar, a crank-shaft, a gear-wheel on the crank of said shaft, gear-wheels on the pulleys meshing with said wheel on the crank, and means to adjust the standard and the crosstree, substantially as and for the purpose described.

8. In a transmission-dynamometer, a standard, a crosstree and driving and driven pulleys thereon, a poise-bar, a shaft therefor, which shaft is concentric with the pivot of the crosstree, means to transmit motion from the pulleys to the poise-bar through said shaft, and means for adjusting the poise-bar on the shaft, substantially as described.

9. In a transmission-dynamometer, overhanging pulleys, a column or standard on which they are mounted, a pedestal in which the column or standard is sustained, and means to adjust the column or standard upon the said pedestal, substantially as described.

Dated Columbus, Ohio, February 8, 1896.

STILLMAN W. ROBINSON.

Witnesses:
MAURICE DONHAM,
M. H. ROBINSON.